United States Patent
Sato et al.

(10) Patent No.: US 12,537,966 B2
(45) Date of Patent: Jan. 27, 2026

(54) METHOD FOR DECODING VIDEO FROM VIDEO BITSTREAM ENCODED USING VIDEO ENCODER, SYSTEM FOR DECODING VIDEO BITSTREAM COMPRISING COMPRESSED VIDEO DATA OF VIDEO, AND COMPUTER-READABLE MEDIUM

(71) Applicant: GUANGDONG OPPO MOBILE TELECOMMUNICATIONS CORP., LTD., Guangdong (CN)

(72) Inventors: Kazushi Sato, Palo Alto, CA (US); Yue Yu, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/695,191

(22) PCT Filed: Sep. 29, 2022

(86) PCT No.: PCT/US2022/077251
§ 371 (c)(1),
(2) Date: Mar. 25, 2024

(87) PCT Pub. No.: WO2023/056348
PCT Pub. Date: Apr. 6, 2023

(65) Prior Publication Data
US 2024/0397063 A1 Nov. 28, 2024

Related U.S. Application Data

(60) Provisional application No. 63/249,942, filed on Sep. 29, 2021.

(51) Int. Cl.
*H04N 19/189* (2014.01)
*H04N 19/172* (2014.01)
*H04N 19/70* (2014.01)

(52) U.S. Cl.
CPC ......... *H04N 19/189* (2014.11); *H04N 19/172* (2014.11); *H04N 19/70* (2014.11)

(58) Field of Classification Search
CPC .... H04N 19/117; H04N 19/172; H04N 19/70; H04N 19/82; H04N 19/176;
(Continued)

(56) References Cited

U.S. PATENT DOCUMENTS

| 2017/0094277 A1 | 3/2017 | Chen et al. |
| 2018/0184123 A1* | 6/2018 | Terada ................... G06T 9/002 |

(Continued)

FOREIGN PATENT DOCUMENTS

| WO | 2021069688 | 4/2021 |
| WO | 2021165569 | 8/2021 |

OTHER PUBLICATIONS

Bross et al., "Overview of the Versatile Video Coding (VVC) Standard and its Applications," IEEE Transactions on Circuit and Systems for Video Technology, Oct. 2021, vol. 31, No. 10.
(Continued)

*Primary Examiner* — Nathnael Aynalem
(74) *Attorney, Agent, or Firm* — Hodgson Russ LLP

(57) ABSTRACT

A method for decoding a video from a video bitstream encoded using a video encoder, a system for decoding a video bitstream, and a non-transitory computer-readable medium are provided. A syntax element indicating a use of a neural-network-based coding tool during encoding a portion of the video bitstream is identified from the video bitstream. A value of the syntax element is determined. If the value of the syntax element indicates the neural-network-
(Continued)

PICTURES WITH NN-BASED CODING TOOLS DISABLED

PICTURES WITH NN-BASED CODING TOOLS ENABLED

LAYER 4
302D

LAYER 3
302C

LAYER 2
302B

LAYER 1
302A based coding tool is enabled during the encoding of the portion of the video bitstream, the portion of the video bitstream is decoded into pictures by using the neural-network-based coding tool. If the value of the syntax element indicates the neural-network-based coding tool is disabled during the encoding of the portion of the video bitstream, the portion of the video bitstream into pictures is decoded without using the neural-network-based coding tool. The decoded pictures are outputted for display.

10 Claims, 7 Drawing Sheets

(58) Field of Classification Search
CPC ...... H04N 19/192; H04N 19/44; H04N 19/80; H04N 19/86; H04N 19/11; H04N 19/186; H04N 19/189; H04N 19/31; H04N 19/85; H04N 19/90; G06N 3/0464; G06N 3/0455
USPC .............................................. 375/240–240.29
See application file for complete search history.

(56) References Cited

U.S. PATENT DOCUMENTS

| | | | |
|---|---|---|---|
| 2019/0075301 | A1 | 3/2019 | Chou et al. |
| 2019/0273948 | A1 | 9/2019 | Yin et al. |
| 2020/0184603 | A1 | 6/2020 | Mukherjee et al. |
| 2020/0252654 | A1 | 8/2020 | Su et al. |
| 2020/0304836 | A1 | 9/2020 | Li et al. |
| 2021/0329286 | A1* | 10/2021 | Wang ............... G06N 3/045 |
| 2022/0094962 | A1* | 3/2022 | Choi ............... H04N 19/136 |
| 2022/0394308 | A1* | 12/2022 | Li ............... H04N 19/82 |

OTHER PUBLICATIONS

Bross et al., "Versatile Video Coding Editorial Refinement on Draft 10," Joint Video Experts Team (JVET) of ITU-T SG 16 WP 3 and ISO/IEC JTC 1/SC 29, Document: JVET-T2001-v1, Oct. 2020.
Seregin et al., "Exploration Experiment on Enhanced Compression beyond VVC capability (EE2)," Joint Video Experts Team (JVET) of ITU-T Sg 16 WP 3 and ISO/IEC JTC 1/SC 29, Document: JVET-W2024-v4, Jul. 2021.
Alshina et al., "Exploration Experiments on Neural Network-based Video Coding (EE1)," Joint Video Exploration Team (JVET) of ITU-T SG 16 WP 3 and ISO/IEC JTC 1/SC 29, Document: JVET-W2023-v3, Jul. 2021.
Ouyang et al., "EE1: SSIM based CNN model for in-loop filtering," Joint Video Experts Team (JVET) of ITU-T SG 16 WP 3 and ISO/IEC JTC 1/SC 29, Document: JVET-W0062-v1, Jul. 2021.
Hannuksela et al., "AHG9: On post-filter SEI," Joint Video Experts Team (JVET) of ITU-T SG 16 WP 3 and ISO/IEC JTC 1/SC 29, Document: JVET-V0058, Apr. 2021.
Choi et al., "AHG9/AHG11: SEI messages for carriage of neural network information for post-filtering," Joint Video Experts Team (JVET) of ITU-T SG 16 WP 3 and ISO/IEC JTC 1/SC 29, Document: JVET-V0091-v2, Apr. 2021.
Hirao et al., "Convolutional Neural Network based Inverse Tone Mapping for High Dynamic Range Display using Lucore," IEEE International Conference on Consumer Electronics (ICCE), 2019.
Takeuchi et al., "A Gamut-Extension Method Considering Color Information Restoration using Convolutional Neural Networks," IEEE International Conference on Image Processing (ICIP), 2019.
WIPO, International Search Report and Written Opinion for International Application No. PCT/US2022/077251, Feb. 14, 2023.
Hsu et al., "Description of SDR video coding technology proposal by MediaTek," Joint Video Experts Team (JVET) of ITU-T SG 16 WP 3 and ISO/IEC JTC 1/SC 29/WG 11, document: JVET-J0018, Apr. 2018.
EPO, Partial Supplementary European Search Report for EP Application No. 22877562.3, Jul. 23, 2025.
EPO, Extended European Search Report for EP Application No. 22877562.3, Nov. 21, 2025.

* cited by examiner

METHOD FOR DECODING VIDEO FROM VIDEO BITSTREAM ENCODED USING VIDEO ENCODER, SYSTEM FOR DECODING VIDEO BITSTREAM COMPRISING COMPRESSED VIDEO DATA OF VIDEO, AND COMPUTER-READABLE MEDIUM

CROSS-REFERENCE TO RELATED APPLICATIONS

This application is a U.S. National Stage entry of International Application No. PCT/US2022/077251, filed Sep. 29, 2022, which claims priority to U.S. Provisional Application No. 63/249,942, filed Sep. 29, 2021, the disclosures of which are hereby incorporated by reference in their entireties.

TECHNICAL FIELD

This disclosure relates generally to computer-implemented methods and systems for video processing. Specifically, the present disclosure involves a method for decoding a video from a video bitstream encoded using a video encoder, a system for decoding a video bitstream comprising compressed video data of a video, and a non-transitory computer-readable medium.

BACKGROUND

The ubiquitous camera-enabled devices, such as smartphones, tablets, and computers, have made it easier than ever to capture videos or images. In addition, there are also non-camera-captured contents, such as screen contents, being generated every day. However, the amount of data for even a short video can be substantially large. Video coding technology (including video encoding and decoding) allows video data to be compressed into smaller sizes thereby allowing various videos to be stored and transmitted. Video coding has been used in a wide range of applications, such as digital TV broadcast, video transmission over the internet and mobile networks, real-time applications (e.g., video chat, video conferencing), DVD and Blu-ray discs, and so on. To reduce the storage space for storing a video and/or the network bandwidth consumption for transmitting a video, it is desired to improve the efficiency of the video coding scheme.

SUMMARY

In a first aspect, a method for decoding a video from a video bitstream encoded using a video encoder, the method comprises: identifying, from the video bitstream, a syntax element indicating a use of a neural-network-based coding tool during encoding a portion of the video bitstream; determining a value of the syntax element; in response to determining that the value of the syntax element indicates the neural-network-based coding tool is enabled during the encoding of the portion of the video bitstream, decoding the portion of the video bitstream into pictures by using the neural-network-based coding tool; in response to determining that the value of the syntax element indicates the neural-network-based coding tool is disabled during the encoding of the portion of the video bitstream, decoding the portion of the video bitstream into pictures without using the neural-network-based coding tool; and outputting the decoded pictures for display.

In a second aspect, a system for decoding a video bitstream comprising compressed video data of a video, comprises: a client device configured for: obtaining a first portion of the compressed video data, the first portion of the compressed video data encoded with a neural-network-based coding tool; transmitting the first portion of the compressed video data to a cloud server; receiving a compressed decoded data of the first portion of the compressed video data from the cloud server; decompressing the received compressed decoded data to generate decoded video data of the first portion of the compressed video data; and decoding a second portion of the compressed video data using the decoded video data; and the cloud server configured for: receiving the first portion of the compressed video data from the client device; decoding the first portion of the compressed video data using the neural-network-based coding tool; compressing the decoded first portion of the compressed video data to generate compressed and decoded video data; and transmitting the compressed and decoded video data to the client device.

In a third aspect, a non-transitory computer-readable medium having program code that is stored thereon, the program code executable by one or more processing devices for performing operations comprising: identifying, from a video bitstream of a video, a syntax element indicating a use of a neural-network-based coding tool during encoding a portion of the video bitstream; determining a value of the syntax element; in response to determining that the value of the syntax element indicates the neural-network-based coding tool is enabled during the encoding of the portion of the video bitstream, decoding the portion of the video bitstream into pictures by using the neural-network-based coding tool; in response to determining that the value of the syntax element indicates the neural-network-based coding tool is disabled during the encoding of the portion of the video bitstream, decoding the portion of the video bitstream into pictures without using the neural-network-based coding tool; and outputting the decoded pictures for display.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
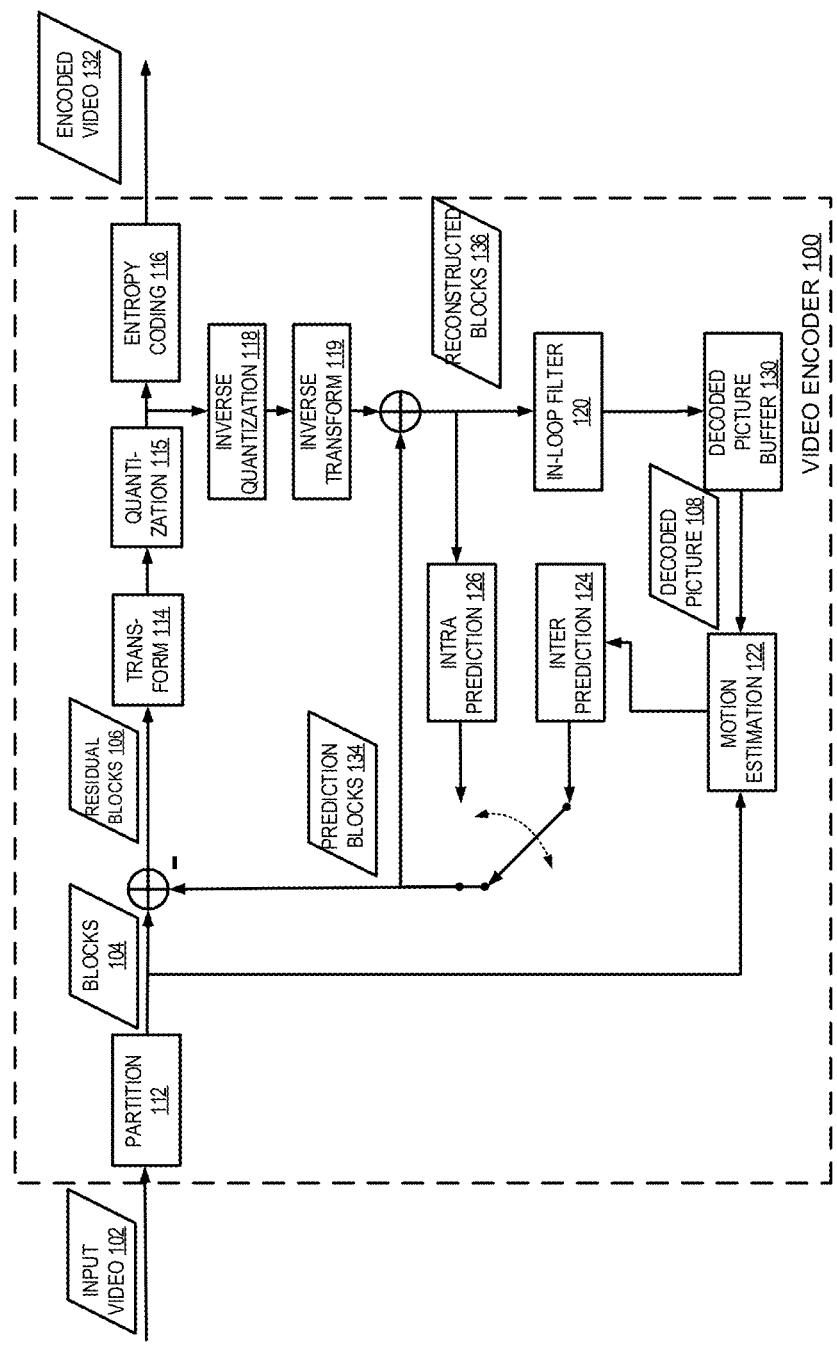
FIG. 1 is a block diagram showing an example of a video encoder configured to implement embodiments presented herein.

Various embodiments provide video coding with selectable neural-network-based encoding tools. As discussed above, more and more video data are being generated, stored, and transmitted. It is beneficial to increase the efficiency of the video coding technology thereby using less data to represent a video without compromising the visual quality of the decoded video. One way to improve the coding efficiency is through using neural-network-based coding tools. The neural-network-based coding tools can be used in various stages of the video coding to improve the coding efficiencies such as at the inter prediction, the intra prediction, or in loop filtering.

However, neural-network-based coding methods require high computational power, such as GPUs with high computational capability. Such GPUs are typically equipped with cloud servers and the capabilities of the GPU in terminals like smartphones are rather limited. As a result, devices with limited power in the GPUs will be unable to decode videos encoded using the neural-network-based coding tools. To address such an issue, the neural-network-based coding tools should be made selectable so that a video bitstream to be decoded by a device with a limited computing power can be encoded with fewer neural-network-based encoding tools than the video bitstream to be decoded by a device with a high computational capacity.

To allow such a flexibility in the implementations of the video encoder and decoder, signaling such as a flag to enable and disable the neural-network-based coding tools can be employed at different levels or layers of the coding scheme. For example, the signaling for the neural-network-based coding tools can be set for sequences in all layers, at the sequence level, at the picture level or the slice level, at the temporal layers, or if it is for the loop filter, together with other loop-filter-related syntax.

In one embodiment, the signaling for the neural-network-based coding tools are set for sequences in all layers of the video coding. The layers may represent different spatial resolutions of the coded video for scalability or different views of the coded video. A flag may be introduced in the video parameter set (VPS) for each layer indicating the use of the neural-network-based coding tool in the encoding of the corresponding layer of the video.

In another embodiment, the signaling for the neural-network-based coding tools are set at the sequence level. For example, a flag can be added in the sequence parameter set (SPS) indicating the use of the neural-network-based coding tool in the encoding of a corresponding sequence of the video.

In another embodiment, the signaling for the neural-network-based coding tools are set at the picture level or the slice level. For example, a flag can be defined in picture parameter set (PPS), in the picture header or in the slice header indicating the use of the neural-network-based coding tool in the encoding of a corresponding picture or slice of the video.

In another embodiment, the signaling for the neural-network-based coding tools are set for the temporal layers. For example, if a sequence of the video is coded with a sublayer structure, a flag can be identified in the VPS or the SPS to indicate the highest sublayer in the sublayer structure for which the neural-network-based coding tool is enabled in the encoding of the sequence.

In another embodiment, the signaling is added for the neural-network-based loop-filter coding tools. Loop filter directly affects image quality of the decoded image as well as coding efficiency. As such, in addition to the syntax proposed in the embodiment described above for the sequence level signaling, a flag for the neural-network-based loop filter can be defined separately from the other neural-network-based coding tools. Alternatively, only the flag for the neural-network-based loop filter coding tools is defined.

In a further embodiment, neural-network-based coding tools are used as post-filter tools to be applied to decoded pictures. For example, neural-network-based tools can be used to improve the quality of the decoded video by creating high dynamic range content from the standard dynamic range content or to expand the color gamut of the decoded video to a wide color gamut. To enable the use of neural-network-based coding tool in the post filter scenarios, a supplemental enhancement information (SEI) message can be used to transmit network parameters as well as neural-network-based post-filter indicators. This embodiment allows the video signals to be coded as standard dynamic range or narrow color gamut content which has a smaller size. The coding artifacts can be reduced by using the neural-network-based coding tools to convert the decoded video content to high dynamic range or white color gamut content.

Referring now to the drawings, FIG. 1 is a block diagram showing an example of a video encoder 100 configured to implement embodiments presented herein. In the example shown in FIG. 1, the video encoder 100 includes a partition module 112, a transform module 114, a quantization module 115, an inverse quantization module 118, an inverse transform module 119, an in-loop filter module 120, an intra prediction module 126, an inter prediction module 124, a motion estimation module 122, a decoded picture buffer 130, and an entropy coding module 116.

The input to the video encoder 100 is an input video 102 containing a sequence of pictures (also referred to as frames or images). In a block-based video encoder, for each of the pictures, the video encoder 100 employs a partition module 112 to partition the picture into blocks 104, and each block contains multiple pixels. The blocks may be macroblocks, coding tree units, coding units, prediction units, and/or prediction blocks. One picture may include blocks of different sizes and the block partitions of different pictures of the video may also differ. Each block may be encoded using different predictions, such as intra prediction or inter prediction or intra and inter hybrid prediction.

Usually, the first picture of a video signal is an intra-predicted picture, which is encoded using only intra prediction. In the intra prediction mode, a block of a picture is predicted using only data from the same picture. A picture that is intra-predicted can be decoded without information from other pictures. To perform the intra-prediction, the video encoder 100 shown in FIG. 1 can employ the intra prediction module 126. The intra prediction module 126 is configured to use reconstructed samples in reconstructed blocks 136 of neighboring blocks of the same picture to generate an intra-prediction block (the prediction block 134). The intra prediction is performed according to an intra-prediction mode selected for the block. The video encoder 100 then calculates the difference between block 104 and the intra-prediction block 134. This difference is referred to as residual block 106.

To further remove the redundancy from the block, the residual block 106 is transformed by the transform module 114 into a transform domain by applying a transform to the samples in the block. Examples of the transform may include, but are not limited to, a discrete cosine transform (DCT) or discrete sine transform (DST). The transformed values may be referred to as transform coefficients representing the residual block in the transform domain. In some examples, the residual block may be quantized directly without being transformed by the transform module 114. This is referred to as a transform skip mode.

The video encoder 100 can further use the quantization module 115 to quantize the transform coefficients to obtain quantized coefficients. Quantization includes dividing a sample by a quantization step size followed by subsequent rounding, whereas inverse quantization involves multiplying the quantized value by the quantization step size. Such a quantization process is referred to as scalar quantization. Quantization is used to reduce the dynamic range of video samples (transformed or non-transformed) so that fewer bits are used to represent the video samples.

The quantization of coefficients/samples within a block can be done independently and this kind of quantization method is used in some existing video compression standards, such as H.264, and HEVC. For an N-by-M block, a specific scan order may be used to convert the 2D coefficients of a block into a 1-D array for coefficient quantization and coding. Quantization of a coefficient within a block may make use of the scan order information. For example, the quantization of a given coefficient in the block may depend on the status of the previous quantized value along the scan order. In order to further improve the coding efficiency, more than one quantizer may be used. Which quantizer is used for quantizing a current coefficient depends on the information preceding the current coefficient in encoding/decoding scan order. Such a quantization approach is referred to as dependent quantization.

The degree of quantization may be adjusted using the quantization step sizes. For instance, for scalar quantization, different quantization step sizes may be applied to achieve finer or coarser quantization. Smaller quantization step sizes correspond to finer quantization, whereas larger quantization step sizes correspond to coarser quantization. The quantization step size can be indicated by a quantization parameter (QP). The quantization parameters are provided in the encoded bitstream of the video such that the video decoder can apply the same quantization parameters for decoding.

The quantized samples are then coded by the entropy coding module 116 to further reduce the size of the video signal. The entropy encoding module 116 is configured to apply an entropy encoding algorithm to the quantized samples. In some examples, the quantized samples are binarized into binary bins and coding algorithms further compress the binary bins into bits. Examples of the binarization methods include, but are not limited to, truncated Rice (TR) and limited k-th order Exp-Golomb (EGk) binarization. To improve the coding efficiency, a method of history-based Rice parameter derivation is used, where the Rice parameter derived for a transform unit (TU) is based on a variable obtained or updated from previous TUs. Examples of the entropy encoding algorithm include, but are not limited to, a variable length coding (VLC) scheme, a context adaptive VLC scheme (CAVLC), an arithmetic coding scheme, a binarization, a context-adaptive binary arithmetic coding (CABAC), syntax-based context-adaptive binary arithmetic coding (SBAC), probability interval partitioning entropy (PIPE) coding, or other entropy encoding techniques. The entropy-coded data is added to the bitstream of the output encoded video 132.

As discussed above, reconstructed blocks 136 from neighboring blocks are used in the intra-prediction of blocks of a picture. Generating the reconstructed block 136 of a block involves calculating the reconstructed residuals of this block. The reconstructed residual can be determined by applying inverse quantization and inverse transform to the quantized residual of the block. The inverse quantization module 118 is configured to apply the inverse quantization to the quantized samples to obtain de-quantized coefficients. The inverse quantization module 118 applies the inverse of the quantization scheme applied by the quantization module 115 by using the same quantization step size as the quantization module 115. The inverse transform module 119 is configured to apply the inverse transform of the transform applied by the transform module 114 to the de-quantized samples, such as inverse DCT or inverse DST. The output of the inverse transform module 119 is the reconstructed residuals for the block in the pixel domain. The reconstructed residuals can be added to the prediction block 134 of the block to obtain a reconstructed block 136 in the pixel domain. For blocks where the transform is skipped, the inverse transform module 119 is not applied to those blocks. The de-quantized samples are the reconstructed residuals for the blocks.

Blocks in subsequent pictures following the first intra-predicted picture can be coded using either inter prediction or intra prediction. In inter-prediction, the prediction of a block in a picture is from one or more previously encoded video pictures. To perform inter prediction, the video encoder 100 uses an inter prediction module 124. The inter prediction module 124 is configured to perform motion compensation for a block based on the motion estimation provided by the motion estimation module 122.

The motion estimation module 122 compares a current block 104 of the current picture with decoded reference pictures 108 for motion estimation. The decoded reference pictures 108 are stored in a decoded picture buffer 130. The motion estimation module 122 selects a reference block from the decoded reference pictures 108 that best matches the current block. The motion estimation module 122 further identifies an offset between the position (e.g., x, y coordinates) of the reference block and the position of the current block. This offset is referred to as the motion vector (MV) and is provided to the inter prediction module 124. In some cases, multiple reference blocks are identified for the block in multiple decoded reference pictures 108. Therefore, multiple motion vectors are generated and provided to the inter prediction module 124.

The inter prediction module 124 uses the motion vector(s) along with other inter-prediction parameters to perform motion compensation to generate a prediction of the current block, i.e., the inter prediction block 134. For example, based on the motion vector(s), the inter prediction module 124 can locate the prediction block(s) pointed to by the motion vector(s) in the corresponding reference picture(s). If there are more than one prediction block, these prediction blocks are combined with some weights to generate a prediction block 134 for the current block.

For inter-predicted blocks, the video encoder 100 can subtract the inter-prediction block 134 from the block 104 to generate the residual block 106. The residual block 106 can be transformed, quantized, and entropy coded in the same way as the residuals of an intra-predicted block discussed above. Likewise, the reconstructed block 136 of an inter-predicted block can be obtained through inverse quantizing, inverse transforming the residual, and subsequently combining with the corresponding prediction block 134.

To obtain the decoded picture 108 used for motion estimation, the reconstructed block 136 is processed by an in-loop filter module 120. The in-loop filter module 120 is configured to smooth out pixel transitions thereby improving the video quality. The in-loop filter module 120 may be configured to implement one or more in-loop filters, such as a de-blocking filter, or a sample-adaptive offset (SAO) filter, or an adaptive loop filter (ALF), etc.

Figure 2:
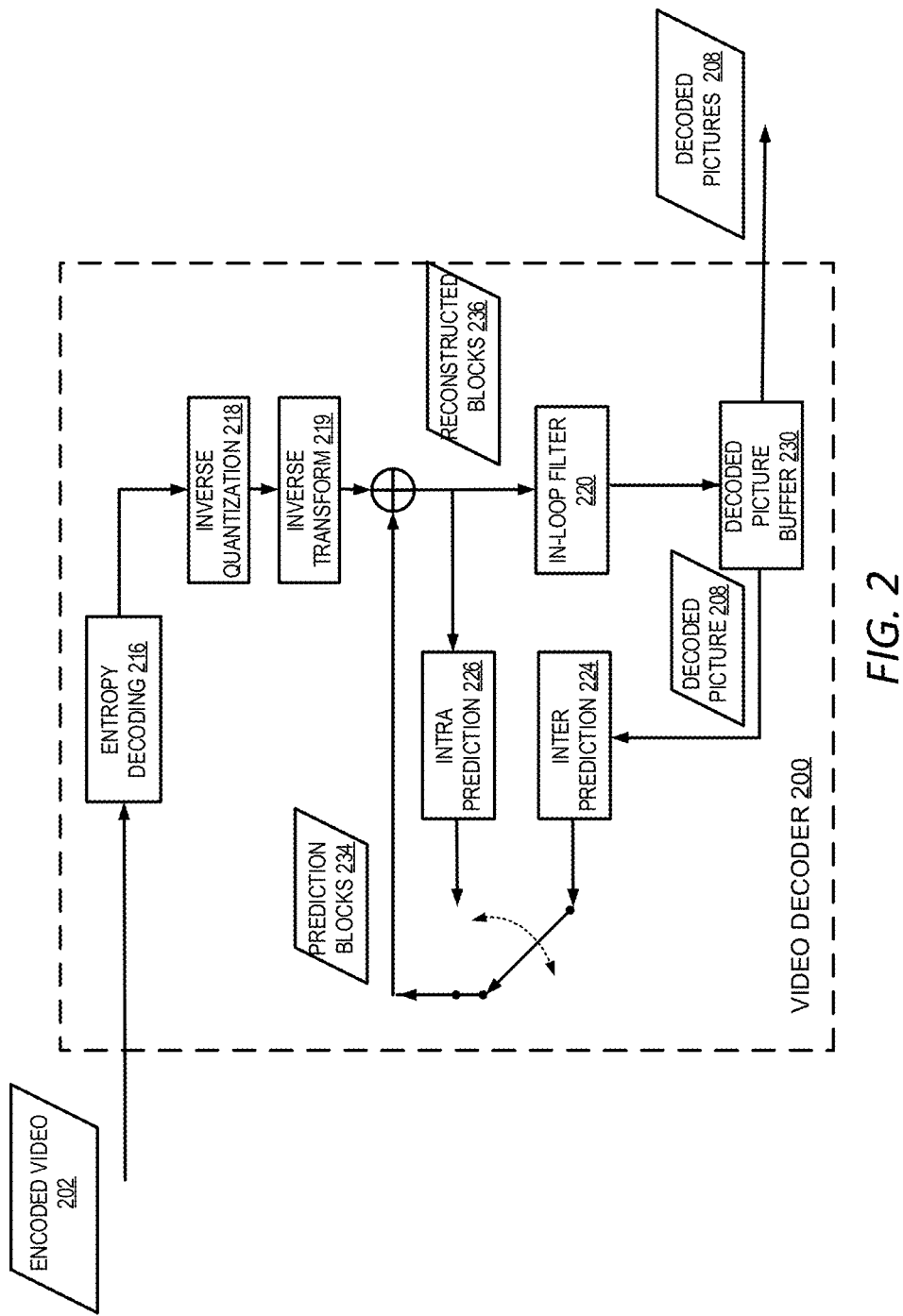
FIG. 2 is a block diagram showing an example of a video decoder configured to implement embodiments presented herein.

FIG. 2 depicts an example of a video decoder 200 configured to implement embodiments presented herein. The video decoder 200 processes an encoded video 202 in a bitstream and generates decoded pictures 208. In the example shown in FIG. 2, the video decoder 200 includes an entropy decoding module 216, an inverse quantization module 218, an inverse transform module 219, an in-loop filter module 220, an intra prediction module 226, an inter prediction module 224, and a decoded picture buffer 230.

The entropy decoding module 216 is configured to perform entropy decoding of the encoded video 202. The entropy decoding module 216 decodes the quantized coefficients, coding parameters including intra prediction parameters and inter prediction parameters, and other information. In some examples, the entropy decoding module 216 decodes the bitstream of the encoded video 202 to binary representations and then converts the binary representations to the quantization levels for the coefficients. The entropy-decoded coefficients are then inverse quantized by the inverse quantization module 218 and subsequently inverse transformed by the inverse transform module 219 to the pixel domain. The inverse quantization module 218 and the inverse transform module 219 function similarly to the inverse quantization module 118 and the inverse transform module 119, respectively, as described above with respect to FIG. 1. The inverse-transformed residual block can be added to the corresponding prediction block 234 to generate a reconstructed block 236. For blocks where the transform is skipped, the inverse transform module 219 is not applied to those blocks. The de-quantized samples generated by the inverse quantization module 118 are used to generate the reconstructed block 236.

The prediction block 234 of a particular block is generated based on the prediction mode of the block. If the coding parameters of the block indicate that the block is intra predicted, the reconstructed block 236 of a reference block in the same picture can be fed into the intra prediction module 226 to generate the prediction block 234 for the block. If the coding parameters of the block indicate that the block is inter-predicted, the prediction block 234 is generated by the inter prediction module 224. The intra prediction module 226 and the inter prediction module 224 function similarly to the intra prediction module 126 and the inter prediction module 124 of FIG. 1, respectively.

As discussed above with respect to FIG. 1, the inter prediction involves one or more reference pictures. The video decoder 200 generates the decoded pictures 208 for the reference pictures by applying the in-loop filter module 220 to the reconstructed blocks of the reference pictures. The decoded pictures 208 are stored in the decoded picture buffer 230 for use by the inter prediction module 224 and also for output.

For Versatile Video Coding (VVC) and beyond, neural-network-based coding methods have been proposed to further improve the coding efficiency. Neural-network-based tools are proposed for the intra prediction (in the intra prediction module 126 and 226), for the inter prediction (in the inter prediction module 124 and 224), for the in-loop filter 120 and 220.

For example, in a neural-network-based intra prediction tool for chroma components, the neighboring reconstructed samples of the luma and the chroma components, and the reconstructed luma samples in the co-located area of the current block are used to predict samples of two chroma blocks based on the neural-network-based intra prediction. The output of the neural-network-based intra prediction is processed and compared with other intra chroma prediction modes to decide the best mode based on the rate distortion cost.

In the neural-network-based inter prediction tool, one or more neural networks can be used to perform the frame interpolation. During the encoding and decoding process, the frame interpolation network receives two reconstructed frames from the reference picture list as inputs and generates a new frame. A cascade filtering network will process the generated frame consequently to output the final interpolated frame. The final interpolated frame will be put into the last position of the reference list for the current picture to be used for the inter prediction.

In the neural-network-based loop filter tool, a convolutional neural-network-based in-loop filter is inserted between the deblocking filter and the sample adaptive offset (SAO). A YUV picture after deblocking and the QP map are input to the neural network, where the neural network processes the input picture patch by patch using a dense residual convolutional neural network. The output of the neural network is provided to the SAO for further processing.

However, neural-network-based coding methods require high computational power, such as GPUs with high computational capability. Such GPUs are typically equipped with cloud servers and the capabilities of the GPU in terminals like smartphones are rather limited. Therefore, the video coding standard should allow developing encoders and decoders with such variation of computing powers.

To allow flexibility in the implementations of the video encoder and decoder, signaling such as a flag to enable and disable the neural-network-based coding tools can be employed at different levels or layers of the coding scheme. For example, the signaling for the neural-network-based coding tools can be set for sequences in all layers, at the sequence level, at the picture level or the slice level, at the temporal layers, or if it is for the loop filter, together with other loop-filter-related syntax.

In one embodiment, the signaling for the neural-network-based coding tools are set for sequences in all layers of the video coding. The layers may represent different spatial resolutions of the coded video for scalability or different views of the coded video. For example, a flag "vps_nn_enabled_flag[i]" can be defined for each layer i in the video parameter set (VPS) as shown in Table 1. Additions are underlined.

TABLE 1

Proposed nn_enabled_flag in VPS

| | Descriptor |
|---|---|
| video_parameter_set_rbsp( ) { | |
| ... | |
| vps_max_layers_minus1 | u(6) |
| ... | |

TABLE 1-continued

Proposed nn_enabled_flag in VPS

| | Descriptor |
|---|---|
| for( i = 0; i <= vps_max_layers_minus1; i++ ) {  vps_nn_enabled_flag[ i ]  ...  } | u(1) |

In some implementations, vps_nn_enabled_flag[i] equal to 1 represents the neural-network-based coding tools are enabled for layer i. vps_nn_enabled_flag[i] equal to 0 represents the neural-network-based coding tools are disabled for layer i.

Alternatively, or additionally, the flags can be defined for each neural-network-based coding tool separately. For example, vps_nn_intra_prediction_enabled_flag[i] can be defined for the neural-network-based intra prediction coding tools and vps_nn_loop_filter_enabled_flag[i] can be defined for the neural-network-based loop filter coding tools. vps_nn_intra prediction_enabled_flag[i] equal to 1 means neural-network-based intra prediction coding tools are enabled for layer i. vps_nn_intra_prediction_enabled_flag[i] equal to 0 means neural-network-based intra prediction coding tools are disabled for layer i. Likewise, vps_nn_loop_filter_enabled_flag[i] equal to 1 means neural-network-based loop-filter coding tools are enabled for layer i. vps_nn_loop_filter_enabled_flag[i] equal to 0 means neural-network-based loop filter coding tools are disabled for layer i.

In another embodiment, the signaling for the neural-network-based coding tools are set at the sequence level. For example, a flag "sps_nn_enabled_flag" can be defined in the sequence parameter set (SPS) as shown in Table 2. Additions are underlined.

TABLE 2

Proposed nn_enabled_flag in SPS

| | Descriptor |
|---|---|
| seq_parameter_set_rbsp( ) {  ...  sps_nn_enabled_flag  ...  } | u(1) |

In some implementations, sps_nn_enabled_flag equal to 1 means the neural-network-based coding tools are enabled for the whole sequence. sps_nn_enabled_flag equal to 0 means the neural-network-based coding tools are disabled for the whole sequence.

Alternatively, or additionally, the flags can be defined for each neural-network-based coding tool separately. For example, sps_nn_intra_prediction_enabled_flag can be defined for the neural-network-based intra prediction coding tools, sps_nn_loop_filter_enabled_flag can be defined for the network-based loop filter coding tools, and sps_nn_inter_prediction_enabled_flag can be defined for the neural-network-based inter prediction coding tools. sps_nn_intra_prediction_enabled_flag equal to 1 means the neural-network-based intra prediction coding tools are enabled for the whole sequence. sps_intra_prediction_nn_enabled_flag equal to 0 means the neural-network-based intra prediction coding tools are disabled for the whole sequence. sps_nn_loop_filter_enabled_flag equal to 1 means the neural-network-based loop filter coding tools are enabled for the whole sequence. sps_nn_loop_filter_enabled_flag equal to 0 means the neural-network-based loop filter coding tools are disabled for the whole sequence. sps_nn_inter_prediction_enabled_flag equal to 1 means the neural-network-based inter prediction coding tools are enabled for the whole sequence. sps_inter_prediction_nn_enabled_flag equal to 0 means the neural-network-based inter prediction coding tools are disabled for the whole sequence.

In another embodiment, the signaling for the neural-network-based coding tools are set at the picture level or the slice level. For example, flags "pps_nn_enabled_flag", "ph_nn_enabled_flag" or "sh_nn_enabled_flag" can be defined in picture parameter set (PPS), in the picture header or in the slice header as shown in Table 3, Table 4 or Table 5, respectively. Additions are underlined.

TABLE 3

Proposed nn_enabled_flag in PPS

| | Descriptor |
|---|---|
| pic_parameter_set_rbsp( ) {  ...  pps_nn_enabled_flag  ...  } | u(1) |

TABLE 4

Proposed nn_enabled_flag in the picture header

| | Descriptor |
|---|---|
| picture_header_structure( ) {  ...  ph_nn_enabled_flag  ...  } | u(1) |

TABLE 5

Proposed nn_enabled_flag in the slice header

| | Descriptor |
|---|---|
| slice_header( ) {  ...  sh_nn_enabled_flag  ...  } | u(1) |

In some implementations, if the value of pps_nn_enabled_flag (or ph_nn_enabled_flag) is 1, neural-network-based coding tools are enabled in the associated picture. If the value of pps_nn_enabled_flag (or ph_nn_elabled_flag) is 0, neural-network-based coding tools are disabled in the associated picture. Likewise, if the value of sh_nn_enabled_flag is 1, neural-network-based coding tools are enabled in the associated slice. If the value of sh_nn_enabled_flag is 0, neural-network-based coding tools are disabled in the associated slice.

Alternatively, or additionally, the flags can be defined for each neural-network-based coding tool separately. For example, pps_nn_intra_prediction_enabled_flag can be defined for neural-network-based intra prediction coding tools in the PPS at the picture level; and pps_nn_loop_filter_enabled_flag can be defined for the neural-network-based loop filter coding tools in the PPS at the picture level.

Similarly, ph_nn_intra_prediction_enabled_flag can be defined for neural-network-based intra prediction coding tools in the picture header at the picture level; and ph_nn_loop_filter_enabled_flag can be defined for the neural-network-based loop filter coding tools in the picture header at the picture level. sh_nn_intra_prediction_enabled_flag can be defined for neural-network-based intra prediction coding tools in the slice header at the slice level; and sh_nn_loop_filter_enabled_flag can be defined for the neural-network-based loop filter coding tools in the slice header at the slice level.

In some implementations, pps_nn_intra_prediction_enabled_flag, ph_nn_intra_prediction_enabled_flag, or sh_nn_intra_prediction_enabled_flag equal to 1 means the neural-network-based intra prediction coding tools are enabled for the associated picture or slice. pps_nn_intra_prediction_enabled_flag, ph_nn_intra_prediction_enabled_flag, or sh_nn_intra_prediction_enabled_flag equal to 0 means the neural-network-based intra prediction coding tools are disabled for the associated picture or slice. Similarly, pps_nn_loop_filter_enabled_flag, ph_nn_loop_filter_enabled_flag, or sh_nn_loop_filter_enabled_flag equal to 1 means the neural-network-based loop filter coding tools are enabled for the associated picture or slice. pps_nn_loop_filter_enabled_flag, ph_nn_loop_filter_enabled_flag, or sh_nn_loop_filter_enabled_flag equal to 0 means the neural-network-based loop filter coding tools are disabled for the associated picture or slice.

In another embodiment, the signaling for the neural-network-based coding tools are set for the temporal layers. For example, if the sequence is coded with hierarchical B structure, the image quality of the lower temporal layer (e.g., I pictures and P pictures) affects the image quality of the higher temporal layer (e.g., B pictures). To implement the neural-network-based coding tools with a good trade-off between the image quality and the computational complexity, the neural-network-based coding tools can be applied to pictures of lower temporal hierarchy.

In this embodiment, a syntax max_nn_enabled_sublayer_minus1 can be defined either in the video parameter set (VPS) or in the sequence parameter set (SPS) as shown in Table 6 or Table 7, respectively. Additions are underlined. The value of max_nn_enabled_sublayer_minus1 shall not exceed the value of the corresponding max_sublayers_minus1.

TABLE 6

Proposed max_nn_enabled_sublayer_minus1 in VPS

| | Descriptor |
|---|---|
| video_parameter_set_rbsp( ) { | |
| ... | |
| vps_max_sublayers_minus1 | u(3) |
| ... | |
| if( vps_max_sublayers_minus1 > 0 ) | |
|    vps_max_nn_enabled_sublayer_minus1 | u(3) |
| ... | |
| } | |

TABLE 7

Proposed max_nn_enabled_sublayer_minus1 in SPS

| | Descriptor |
|---|---|
| seq_parameter_set_rbsp( ) { | |
| ... | |
| sps_max_sublayers_minus1 | u(3) |
| ... | |
| if( sps_max_sublayers_minus1 > 0) | |
|    sps_max_nn_enabled_sublayer_minus1 | u(3) |
| ... | |
| } | |

For the temporal layers smaller than or equal to (max_nn_enabled_sublayer_minus1+1), the neural-network-based coding tools are enabled. For the temporal layer greater than (max_nn_enabled_sublayer_minus1+1) the neural-network-based coding tools are disabled.

Alternatively, or additionally, the syntax can be defined for each neural-network-based coding tool separately. For example, vps_max_nn_intra_prediction_enabled_sublayer_minus1 and vps_max_nn_loop_filter_enabled_sublayer_minus1 can be defined for the neural-network-based intra prediction coding tools and the network-based loop filter coding tools, respectively, in the VPS. sps_max_nn_intra_prediction_enabled_sublayer_minus1 and sps_max_nn_loop_filter_enabled_sublayer_minus1 can be defined for the neural-network-based intra prediction coding tools and the network-based loop filter coding tools, respectively, in the SPS.

Given the above syntax, for the temporal layers smaller than or equal to (max_nn_intra_prediction_enabled_sublayer_minus1+1), neural-network-based intra prediction coding tools are enabled. For the temporal layers greater than (max_nn_intra_prediction_enabled_sublayer_minus1+1), the neural-network-based intra prediction coding tools are disabled. Similarly, for the temporal layers smaller than or equal to (max_nn_loop_filter_enabled_sublayer_minus1+1), the neural-network-based loop filter coding tools are enabled. For the temporal layers greater than (max_nn_loop_filter_enabled_sublayer_minus1+1), the neural-network-based loop filter coding tools are disabled.

Figure 3:
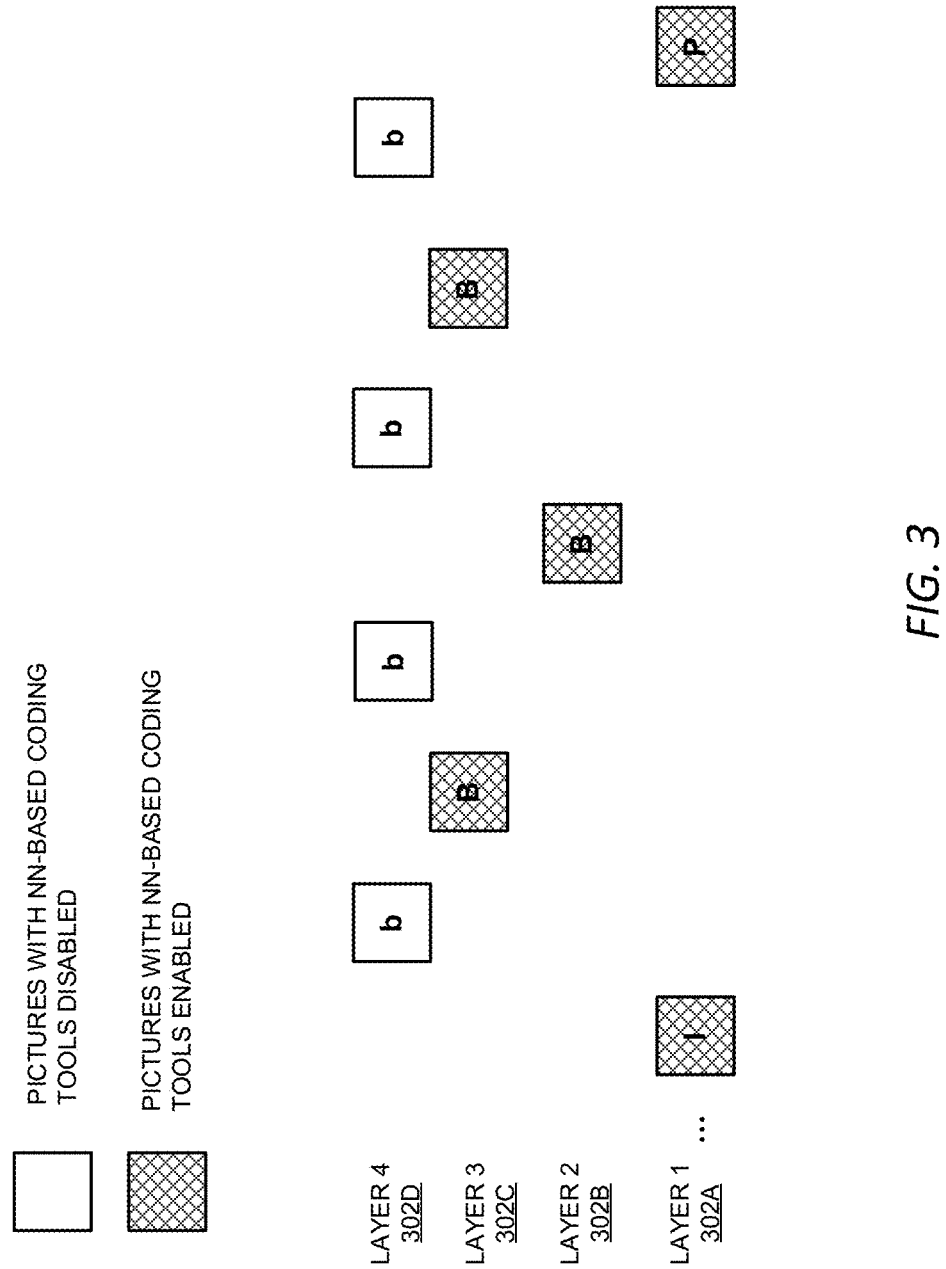
FIG. 3 shows an example of the sub-layer structure of the video coding scheme with the neural-network-based coding tools enabled for certain temporal layers, according to some embodiments of the present disclosure.

FIG. 3 shows an example of the sub-layer structure of the video coding scheme with the neural-network-based coding tools enabled for certain temporal layers, according to some embodiments of the present disclosure. In FIG. 3, there are four layers 302A-302D. The first layer, layer 1 302A, includes I pictures and P pictures used to predict other pictures, such as B pictures. The second layer, layer 2 302B, includes B pictures that are used to predict other pictures. The third layer, layer 3 302C, also includes B pictures that are used to make predictions for other frames. The fourth layer, layer 4 302D, includes B pictures that are not used to predict other pictures. In this example, because there are four temporal layers, max_sublayers_minus1 is set to 3 The max_nn_enabled_sublayers_minus1 is set to 2 and thus the three lowest temporal layers 302A-302C have the neural-network-based coding tools enabled. The neural-network-based coding tools are disabled for the highest temporal layer 302D.

This example can also be realized with the previous embodiment where the signaling is indicated at the picture level. However, fewer bits are needed with the current embodiment. More specifically, in this embodiment, for a group of pictures with x pictures and y sub-layers (y<x and y is on the scale of $\log_2(x)$), $\log_2(y)$ bits are used to indicate the maximum sub-layer (e.g., using the syntax max_nn_enabled_sublayer_minus1) for which the neural-network-based coding tools are enabled. In contrast, the previous embodiment would require x bits for the x picture-level flags. Therefore, the current embodiment can reduce the number of bits used to signal the use of the neural-network-based coding tools and thus provide an improved coding efficiency than the previous embodiment. In an alternative solution, one bit for each sub-layer can be used to indicate if the current sub-layer has the neural-network-based coding tools enabled or disabled. In this solution, the total number of bits for signaling the use of the neural-network-based coding tools is y which is still less than the x bits required by the previous embodiment.

In another embodiment, the signaling is added for the neural-network-based loop-filter coding tools. Loop filter directly affects image quality of the decoded image. As such, in addition to the syntax proposed in the embodiment described above for the sequence level signaling, a flag for the neural-network-based loop filter can be defined separately from the other neural-network-based coding tools. Alternatively, only the flag for the neural-network-based loop filter coding tools is defined.

In this embodiment, a flag for the neural-network-based loop filter, alf_nn_filter_enabled_flag, can be defined either in the sequence parameter set (SPS) or in the syntax alf_data( ). Table 8 and Table 9 each show an example of defining the alf_nn_filter_enabled_flag in the SPS. Table 10 shows an example of defining the alf_nn_filter_enabled_flag in the syntax alf_data( ). Additions are underlined.

TABLE 8

Proposed alf_nn_filter_enabled_flag in SPS

|  | Descriptor |
|---|---|
| seq_parameter_set_rbsp( ) { |  |
| ... |  |
| sps_nn_enabled_flag | u(1) |
| ... |  |
| sps_sao_enabled_flag | u(1) |
| if(! sps_nn_enabled_flag) |  |
| sps_alf_nn_filter_enabled_flag | u(1) |
| sps_alf_enabled_flag | u(1) |
| ... |  |
| } |  |

TABLE 9

Proposed alf_nn_filter_enabled_flag in SPS

|  | Descriptor |
|---|---|
| seq_parameter_set_rbsp( ) { |  |
| ... |  |
| sps_sao_enabled_flag | u(1) |
| sps_alf_nn_filter_enabled_flag | u(1) |
| sps_alf_enabled_flag | u(1) |
| ... |  |
| } |  |

TABLE 10

Proposed alf_nn_filter_enabled_flag in alf_data( )

|  | Descriptor |
|---|---|
| alf_data( ) { |  |
| ... |  |
| alf_nn_filter_enabled_flag | u(1) |
| ... |  |
| } |  |

In the above examples, alf_nn_enabled_flag equal to 1 means that the neural-network-based coding tools are enabled for the whole sequence or the associated pictures or slices. alf_nn_enabled_flag equal to 0 means that the neural-network-based coding tools are disabled for the whole sequence or the associated pictures or slices.

In another example, the alf_nn_filter_enabled_flags are defined for luma and chroma components separately, such as alf_luma_nn_filter_enabled_flag and alf_chroma_nn_filter_enabled_flag. alf_nn_luma_enabled_flag equal to 1 means that the neural-network-based coding tools are enabled for the luma component in the whole sequence or the associated pictures or slices. alf_nn_luma_enabled_flag equal to 0 means that the neural-network-based coding tools are disabled for the luma component in the whole sequence or the associated pictures or slices. Likewise, alf_nn_chroma_enabled_flag equal to 1 means that the neural-network-based coding tools are enabled for the chroma components in the whole sequence or the associated pictures or slices. alf_nn_luma_enabled_flag equal to 0 means that the neural-network-based coding tools are disabled for the chroma components in the whole sequence or the associated pictures or slices.

Figure 4:
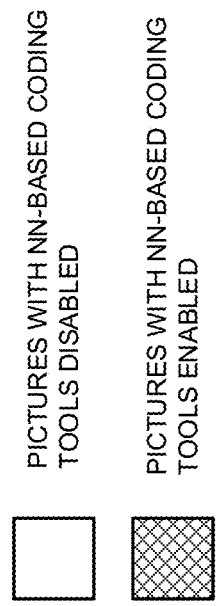
FIG. 4 shows an example of the cloud assisted decoding based on the neural-network-based coding tools, according to some embodiments of the present disclosure.
Figure 4:
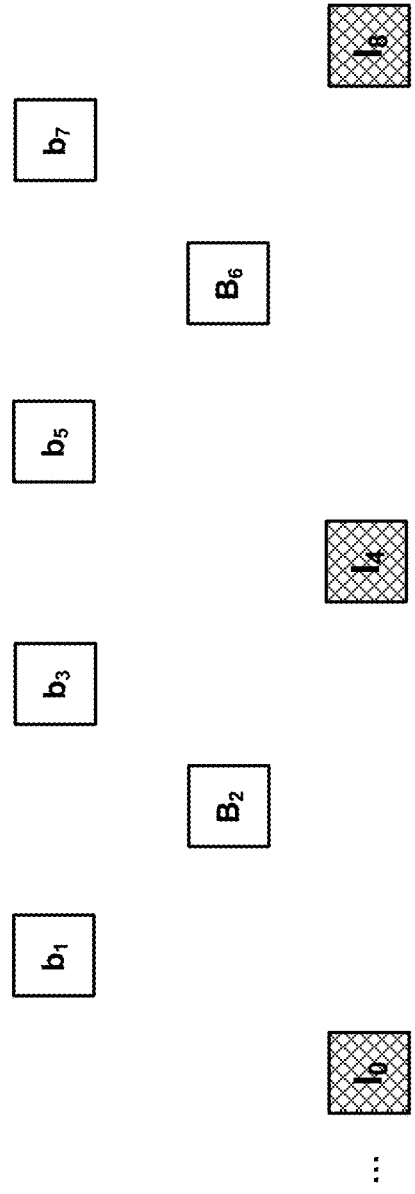

By providing the flexibility of enabling and disabling the neural-network-based coding tools, cloud assisted decoding and encoding can be performed. Devices configured with GPUs having high computational capability can execute the neural-network-based coding tools without any issues. However, computational capability of GPUs installed in terminals like smartphones is rather limited. The cloud-assisted video decoding and encoding can solve this issue. FIG. 4 shows an example of cloud assisted decoding based on the neural-network-based coding tools, according to some embodiments of the present disclosure. In this example, only I pictures are coded with neural-network-based coding tools. The video bitstream can be decoded with the following procedure with a cloud assisted system. A client device, when decoding a video bitstream, transmits the compressed data of $I_0$ and $I_4$ pictures to a cloud server. The cloud server has more computational power than the client device, and thus is more capable of decoding the compressed video using the neural-network-based coding tools. At the cloud server, $I_0$ and $I_4$ pictures are decoded with neural-network-based coding tools as indicated by the syntax in the compressed video. The cloud server compresses the decoded pictures of $I_0$ and $I_4$ losslessly and transmits the compressed decoded pictures to the client device.

The client device receives the compressed decoded pictures and decompresses them and store the decompressed pictures in a frame memory. The client device then decodes picture $b_1$, $B_2$ and $b_3$ without using neural-network-based coding tools by using $I_0$ and $I_4$ pictures stored in the frame memory as reference pictures. To decode further pictures, the client device transmits the compressed data of picture $I_8$ to the cloud server. The cloud server decodes picture $I_8$ with neural-network-based coding tools. Similarly, the cloud server losslessly compresses the decoded picture $I_8$ and transmits it to the client device. The client device decompresses the decoded picture $I_8$ and store it in the frame memory. The client device further decodes pictures $b_5$, $B_6$ and $b_7$ without using neural-network-based coding tools by using $I_4$ and $I_8$ pictures stored in the frame memory as referenced pictures. In the above example, the client device decoding B pictures using the I pictures as reference pictures can be performed in parallel with the cloud server decoding the I pictures using the neural-network-based coding tools.

Figure 5:
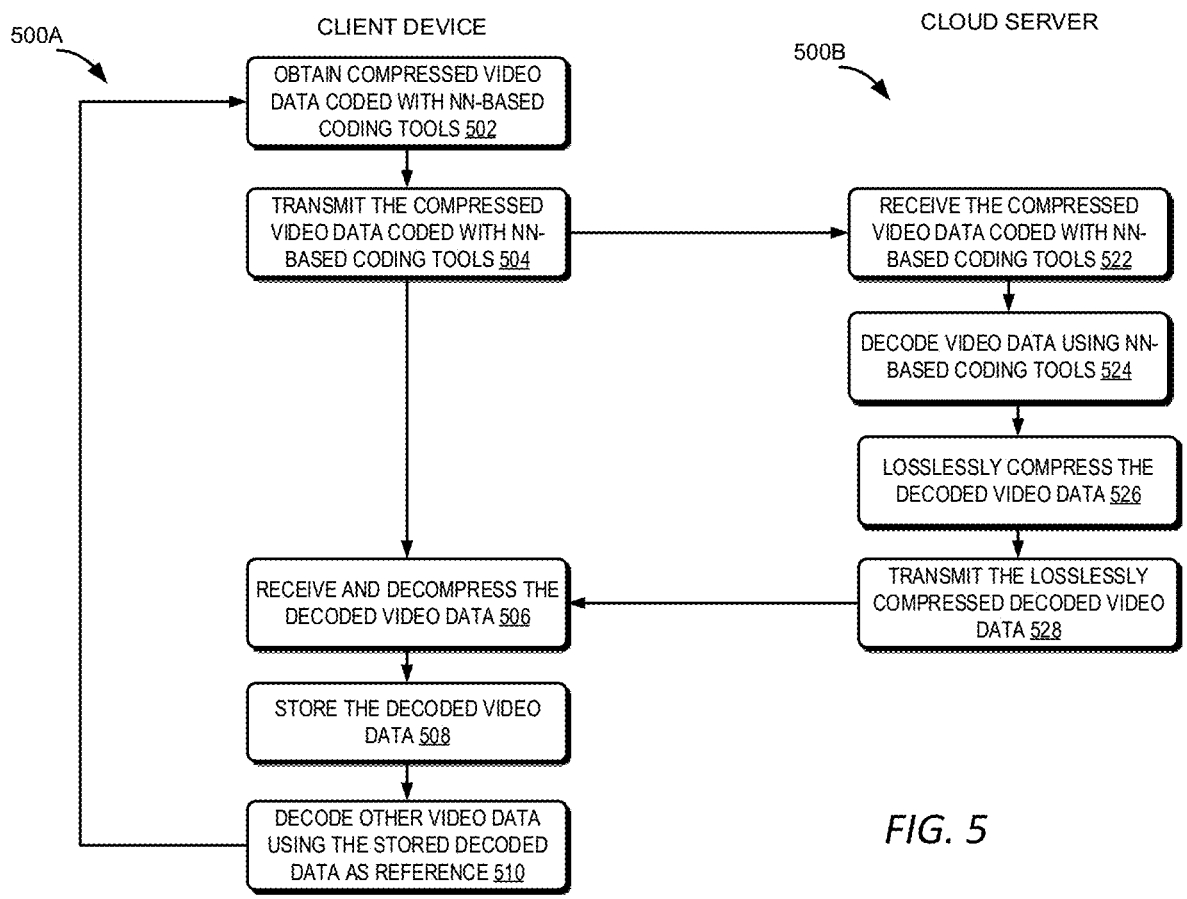
FIG. 5 depicts several flow diagrams that illustrate several processes for the cloud assisted decoding based on the neural-network-based coding tools, according to some embodiments of the present disclosure.

FIG. 5 depicts several flow diagrams that illustrate several processes 500A and 500B for cloud assisted decoding based on the neural-network-based coding tools, according to some embodiments of the present disclosure. Process 500A illustrates aspects of the client device and the process 500B illustrates aspects of the cloud server. The processes 500A and 500B will be described together below.

At block 502, the process 500A involves obtaining compressed video data that were encoded with the neural-network-based coding tools. For example, The client device can determine that, based on the syntax in the video bitstream, a portion of the video was encoded with neural-network-based coding tools. For instance, as shown in FIG. 4, the compressed video data can include the I pictures (or P pictures) that were encoded with the neural-network-based encoding tools. In another example, the syntax in the video bitstream may indicate that a certain layer of the video was encoded with the neural-network-based coding tools. The client device obtains the portion of the compressed video that was encoded with the neural-network-based coding tools. At block 504, the process 500A involves transmitting the compressed video data encoded with the neural-network-based coding tools to the cloud server.

At block 522, the process 500B involves the cloud server receiving the compressed video data that were encoded with the neural-network-based coding tools. At block 524, the process 500B involves the cloud server decoding the received video data using the neural-network-based coding tools as specified in the syntax of the compressed video data. For example, if a syntax in the video data indicates that the neural-network-based intra-prediction coding tools were used at the encoding for a part of the video data, the cloud server will decode the part of the video data using the neural-network-based intra prediction coding tools. Likewise, if the syntax in the video data indicates that the neural-network-based loop filter coding tools were used at the encoding for a part of the video data, the cloud server will decode a part of the video data using the neural-network-based loop filter coding tools. At block 526, the process 500B involves the closed server compressing the decoded video data in a lossless manner. At block 528, the cloud server transmits the losslessly compressed decoded data to the client device.

At block 506, the process 500A involves the client device receiving and decompressing the decoded video data. At block 508, the client device stores the decoded video data in a frame memory so that they can be used for decoding future pictures in the video bitstream. For example, the decoded video data may include I frames and P frames and they can be saved in the frame memory for decoding future P frames or B frames. At block 510, the process 500A involves the client device decoding other video data using the stored decoded data (e.g., the I frames and P frames) in the frame memory as references. The client device may continue to decode the video bitstream and repeat the steps 502-510 in the process 500A. As mentioned in the example of FIG. 4, step 510 of the process 500A can be performed in parallel with the steps 522-528 of the process 500B.

While FIG. 5 describes the process of decoding a video stream using the cloud assisted system, the same framework can be used during the encoding of a video signal. For example, a video encoder, when encoding a video signal, may leverage the computing power of another device that is in communication with the video encoder to encode the video signal. The video encoder can send a portion the video signal to be encoded with the neural-network-based encoding tools to another device which has the power to implement the neural-network-based coding tools to encode the portion of the video signal so that the computing workload of the video encoder can be reduced. The video encoder and the other device can perform the encoding in parallel so that the overall encoding process can be speed up.

Figure 6:
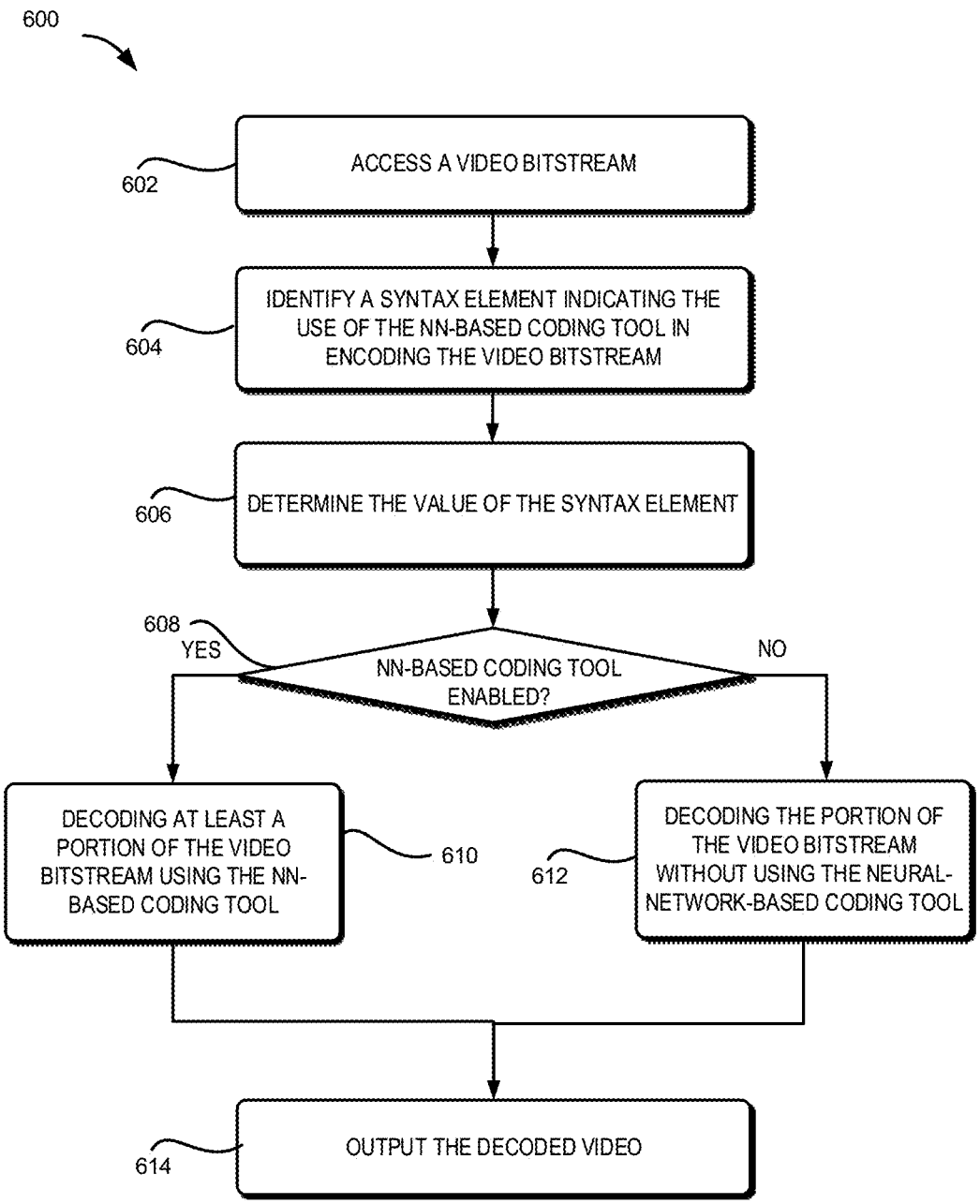
FIG. 6 depicts an example of a process 600 for decoding a video bitstream encoded with selectable neural-network-based coding tools, according to some embodiments of the present disclosure.

FIG. 6 depicts an example of a process 600 for decoding a video bitstream encoded with selectable neural-network-based coding tools, according to some embodiments of the present disclosure. One or more computing devices implement operations depicted in FIG. 6 by executing suitable program code. For example, a computing device implementing the video decoder 200 may implement the operations depicted in FIG. 6 by executing the program code for the intra prediction module 226, the inter prediction module 224, and the in-loop filter 220. For illustrative purposes, the process 600 is described with reference to some examples depicted in the figures. Other implementations, however, are possible.

At block 602, the process 600 involves accessing a bitstream of a video signal. The video bitstream is generated by encoding the video signal using selectable neural-network-based coding tools. At block 604, the process 600 involves identifying, from the video bitstream, a syntax element indicating the use of a neural-network-based coding tool during encoding the video bitstream. The neural-network-based coding tool may be a neural-network-based intra prediction coding tool or a neural-network-based loop-filter coding tool.

As discussed above, the syntax element may be identified in a video parameter set (VPS) and include a flag for each layer of the video indicating the use of the neural-network-based coding tool in the encoding of the corresponding layer of the video. The syntax element may be identified in a sequence parameter set (SPS) and include a flag indicating the use of the neural-network-based coding tool in the encoding of a corresponding sequence of the video. In another example, the syntax element may be identified in at least one of a picture parameter set (PPS), a picture header, or a slice header and include a flag indicating the use of the neural-network-based coding tool in the encoding of a corresponding picture or slice of the video. In cases where a sequence of the video is encoded with a sublayer structure, the syntax element may be identified a video parameter set (VPS) or a sequence parameter set (SPS) and indicate a highest sublayer in the sublayer structure for which the neural-network-based coding tool is enabled in the encoding of the sequence. In another example, the syntax element may be identified in a sequence parameter set (SPS) or a syntax alf_data( ) and include a flag indicating the use of a neural-network-based loop-filter coding tool in the encoding of a corresponding sequence or a corresponding picture or slice of the video.

At block 606, the process 600 involves determining the value of the syntax element. As discussed above, if the syntax element is a flag indicating whether the neural-network-based coding tool is enabled or not, the value of the syntax element may be zero or one with zero indicating the neural-network-based coding tool is disabled and one indicating the neural-network-based coding tool is enabled for the corresponding layer, picture, or slice or the corresponding color component. If the syntax element is a value indicating the maximum number of sublayers for which the neural-network-based coding tools are enabled, such as max_nn_enabled_sublayers_minus1, the sublayers that are higher than the syntax value will have the neural-network-based encoding tool disabled.

At block 608, the process 600 involves determining whether the neural-network-based coding tool is enabled for the current layer, sublayer, sequence, picture, slice, or color component based on the type and value of the syntax element as discussed above.

If the neural-network-based coding tool is enabled, the process 600 involves, at block 610, decoding at least a portion of the video bitstream using the neural-network-based coding tool. The portion of the video stream may correspond to a layer, a sublayer, a sequence, a picture, a slice, or a color component depending on the type of the syntax element. If it is determined that the neural-network-based coding tool is disabled, the process 600 involves, at block 612, decoding the portion of the video bitstream without using the neural-network-based coding tool. At block 614, the process 600 involves outputting the decoded video for display.

It should be understood that steps 604 to 612 of process 600 may be repeated multiple times for the video bitstream in order to decode the entire video bitstream. Further, step 610 may be performed by the video decoder locally or by a cloud server as discussed above with respect to FIGS. 4 and 5.

In some examples, the neural-network-based coding tool is also used as a post-filter tool to be applied to the decoded pictures 208. In the neural-network-based post filter tool, a super resolution neural network is used as a post filter tool to improve the quality of the decoded video. The parameters of the neural network can be sent through a supplemental enhancement information (SEI) message. Table 11 shows an example of the syntax element "nn_post_filter_type_idc" in the SEI message for the neural-network-based post-filtering tool.

TABLE 11

| nn_postfilter_type_idc | Post filtering type |
| --- | --- |
| 0 | Visual quality improvement with single input picture |
| 1 | Visual quality improvement with multiple input pictures |
| 2 | Super resolution with single input picture |
| 3 | Super resolution with multiple input pictures |
| 4 . . . 15 | Reserved |

The neural-network-based post-filtering tool can also be used to create the high dynamic range (HDR) content from the standard dynamic range (SDR) content and to expand the color-gamut.

However, different displays have different capabilities. Some displays support the HDR and wide color-gamut while others just support the SDR and narrow color-gamut. In addition, the dynamic range of pixels are larger for HDR and wide color-gamut (WCG) content than for the SDR and narrow color-gamut content. As such, HDR and WCG content requires more bits for compression. To provide a better compression efficiency, the video can be encoded as SDR or narrow-gamut contents with fewer bits, instead of HDR or wide color-gamut content. For example, prior to encoding, the video is down-sampled in terms of the dynamic range or color gamut so that the dynamic range of the pixels is reduced. The down-sampled video is encoded, stored or transmitted, and decoded as usual. To reduce the coding artefact of the coded, the decoding can be followed by converting the encoded content to HDR or wide-color gamut contents. The conversion is performed by using neural-network-based coding tools. Network parameters as well as neural-network-based post-filter indicators for dynamic range or color-gamut conversion are transmitted either in the SEI messages or in the system layer. The converting can be performed by using the neural-network-based post-filtering tools.

To enable the use of neural-network-based post-filtering for the dynamic range conversion and the color gamut conversion, the definition of "nn_postfilter_type_idc" shown in Table 11 is extended as shown in Table 12 (additions are underlined).

TABLE 12

Improved NN-based Postfilter Type

| nn_postfilter_type_idc | Post filtering type |
| --- | --- |
| 0 | Visual quality improvement with single input picture |
| 1 | Visual quality improvement with multiple input pictures |
| 2 | Super resolution with single input picture |
| 3 | Super resolution with multiple input pictures |
| <u>4</u> | <u>Dynamic range extension with single input picture</u> |
| <u>5</u> | <u>Dynamic range extension with multiple input pictures</u> |
| <u>6</u> | <u>Color gamut extension with single input picture</u> |
| <u>7</u> | <u>Color gamut extension with multiple input pictures</u> |
| 8 . . . 15 | Reserved |

By allowing the use of the neural-network-based coding tools for dynamic range extension and color gamut extension, coding artefacts can be reduced while keeping a low bitrate. In addition, if the display device does not support HDR or WCG, decoding the video signal without the dynamic range extension and color gamut extension would be sufficient. Therefore, the storage space and network bandwidth are reduced because a smaller file is used to store and/or transmit the encoded SDR or narrow color-gamut content.

Figure 7:
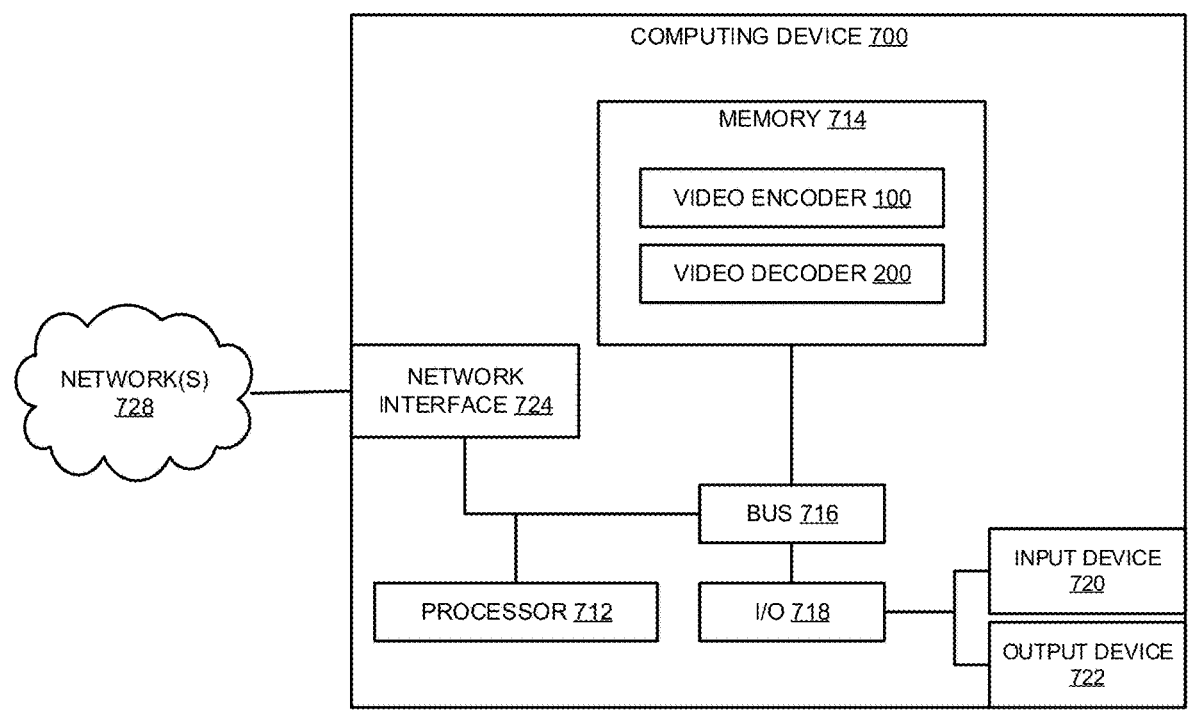
FIG. 7 depicts an example of a computing system that can be used to implement some embodiments of the present disclosure.

Computing System Example for Implementing Dependent Quantization for Video Coding Any suitable computing system can be used for performing the operations described herein. For example, FIG. 7 depicts an example of a computing device 700 that can implement the video encoder 100 of FIG. 1 or the video decoder 200 of FIG. 2. In some embodiments, the computing device 700 can include a processor 712 that is communicatively coupled to a memory 714 and that executes computer-executable program code and/or accesses information stored in the memory 714. The processor 712 may comprise a microprocessor, an application-specific integrated circuit ("ASIC"), a state machine, or other processing device. The processor 712 can include any of a number of processing devices, including one. Such a processor can include or may be in communication with a computer-readable medium storing instructions that, when executed by the processor 712, cause the processor to perform the operations described herein.

The memory 714 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 700 can also include a bus 716. The bus 716 can communicatively couple one or more components of the computing device 700. The computing device 700 can also include a number of external or internal devices such as input or output devices. For example, the computing device 700 is shown with an input/output ("I/O") interface 718 that can receive input from one or more input devices 720 or provide output to one or more output devices 722. The one or more input devices 720 and one or more output devices 722 can be communicatively coupled to the I/O interface 718. The communicative coupling can be implemented via any suitable manner (e.g., a connection via a printed circuit board, connection via a cable, communication via wireless transmissions, etc.). Non-limiting examples of input devices 720 include a touch screen (e.g., one or more cameras for imaging a touch area or pressure sensors for detecting pressure changes caused by a touch), a mouse, a keyboard, or any other device that can be used to generate input events in response to physical actions by a user of a computing device. Non-limiting examples of output devices 722 include an LCD screen, an external monitor, a speaker, or any other device that can be used to display or otherwise present outputs generated by a computing device.

The computing device 700 can execute program code that configures the processor 712 to perform one or more of the operations described above with respect to FIGS. 1-6. The program code can include the video encoder 100 or the video decoder 200. The program code may be resident in the memory 714 or any suitable computer-readable medium and may be executed by the processor 712 or any other suitable processor.

The computing device 700 can also include at least one network interface device 724. The network interface device 724 can include any device or group of devices suitable for establishing a wired or wireless data connection to one or more data networks 728. Non-limiting examples of the network interface device 724 include an Ethernet network adapter, a modem, and/or the like. The computing device 700 can transmit messages as electronic or optical signals via the network interface device 724.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Some blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for decoding a video from a video bitstream encoded using a video encoder, the method comprising:
    identifying, from the video bitstream, a syntax element indicating a use of a neural-network-based coding tool during encoding a portion of the video bitstream;
    determining a value of the syntax element;
    in response to determining that the value of the syntax element indicates the neural-network-based coding tool is enabled during the encoding of the portion of the video bitstream, decoding the portion of the video bitstream into pictures by using the neural-network-based coding tool;
    in response to determining that the value of the syntax element indicates the neural-network-based coding tool is disabled during the encoding of the portion of the video bitstream, decoding the portion of the video bitstream into pictures without using the neural-network-based coding tool; and outputting the decoded pictures for display;

wherein a sequence of the video is coded with a sublayer structure, wherein the syntax element is identified in a video parameter set (VPS) or a sequence parameter set (SPS) and indicates a highest sublayer in the sublayer structure for which the neural-network-based coding tool is enabled in the encoding of the sequence.

2. The method of claim 1, wherein the neural-network-based coding tool is one of a neural-network-based intra prediction coding tool or a neural-network-based loop-filter coding tool.

3. The method of claim 1, wherein decoding at least the portion of the video bitstream into pictures by using the neural-network-based coding tool comprises:

transmitting the portion of the video bitstream to a cloud server for decoding the portion of the video bitstream using the neural-network-based coding tool;

receiving a compressed decoded data of the portion of the video bitstream from the cloud server;

decompressing the received compressed decoded data to generate decoded video data of the portion of the video bitstream; and wherein the decoded video data of the portion of the video bitstream is used to decode a second portion of the video bitstream.

4. A system for decoding a video bitstream comprising compressed video data of a video, comprising:

a client device configured for:
obtaining a first portion of the compressed video data, the first portion of the compressed video data encoded with a neural-network-based coding tool;
transmitting the first portion of the compressed video data to a cloud server;
receiving a compressed decoded data of the first portion of the compressed video data from the cloud server;
decompressing the received compressed decoded data to generate decoded video data of the first portion of the compressed video data; and
decoding a second portion of the compressed video data using the decoded video data; and the cloud server configured for:
receiving the first portion of the compressed video data from the client device;
decoding the first portion of the compressed video data using the neural-network-based coding tool;
compressing the decoded first portion of the compressed video data to generate compressed and decoded video data; and
transmitting the compressed and decoded video data to the client device.

5. The system of claim 4, wherein the client device is further configured to determining the first portion of the compressed video data based on a syntax element in the video bitstream.

6. The system of claim 5, wherein the syntax element satisfies at least one of:

the syntax element is identified in a video parameter set (VPS) and comprises a flag for each layer of the video indicating the use of the neural-network-based coding tool in encoding a corresponding layer of the video;

the syntax element is identified in a sequence parameter set (SPS) and comprises a flag indicating the use of the neural-network-based coding tool in encoding a corresponding sequence of the video;

the syntax element is identified in at least one of a picture parameter set (PPS), a picture header, or a slice header and comprises a flag indicating the use of the neural-network-based coding tool in encoding a corresponding picture or slice of the video;

the syntax element is identified in a video parameter set (VPS) or a sequence parameter set (SPS) and indicates a highest sublayer in a sublayer structure for which the neural-network-based coding tool is enabled in encoding a corresponding sequence; or the syntax element is identified in a sequence parameter set (SPS) or a syntax alf_data( ) and comprises a flag indicating a use of a neural-network-based loop-filter coding tool in encoding a corresponding sequence or a corresponding picture or slice of the video.

7. The system of claim 4, wherein compressing the decoded first portion comprises losslessly compressing the decoded first portion.

8. The system of claim 4, wherein the neural-network-based coding tool is one of a neural-network-based intra prediction coding tool or a neural-network-based loop-filter coding tool.

9. A non-transitory computer-readable medium having program code that is stored thereon, the program code executable by one or more processing devices for performing operations comprising:

identifying, from a video bitstream of a video, a syntax element indicating a use of a neural-network-based coding tool during encoding a portion of the video bitstream;

determining a value of the syntax element;

in response to determining that the value of the syntax element indicates the neural-network-based coding tool is enabled during the encoding of the portion of the video bitstream, decoding the portion of the video bitstream into pictures by using the neural-network-based coding tool;

in response to determining that the value of the syntax element indicates the neural-network-based coding tool is disabled during the encoding of the portion of the video bitstream, decoding the portion of the video bitstream into pictures without using the neural-network-based coding tool; and outputting the decoded pictures for display;

wherein a sequence of the video is coded with a sublayer structure, wherein the syntax element is identified in a video parameter set (VPS) or a sequence parameter set (SPS) and indicates a highest sublayer in the sublayer structure for which the neural-network-based coding tool is enabled in the encoding of the sequence.

10. The non-transitory computer-readable medium of claim 9, wherein the neural-network-based coding tool is one of a neural-network-based intra prediction coding tool or a neural-network-based loop-filter coding tool.

* * * * *